(12) United States Patent
Hoerle et al.

(10) Patent No.: US 8,099,736 B2
(45) Date of Patent: Jan. 17, 2012

(54) SYSTEMS AND METHODS PROVIDING INTELLIGENT ROUTING OF DATA BETWEEN SOFTWARE SYSTEMS

(75) Inventors: Dale E. Hoerle, Naperville, IL (US); Jeffery K. Hensley, Genoa, IL (US)

(73) Assignee: The TriZetto Group, Inc., Greenwood Village, CO (US)

( * ) Notice: Subject to any disclaimer, the term of this patent is extended or adjusted under 35 U.S.C. 154(b) by 1516 days.

(21) Appl. No.: 10/964,941

(22) Filed: Oct. 14, 2004

(65) Prior Publication Data

US 2006/0085796 A1    Apr. 20, 2006

(51) Int. Cl.
*G06F 9/44* (2006.01)
*G06F 15/173* (2006.01)

(52) U.S. Cl. .................. 719/313; 719/319; 709/238
(58) Field of Classification Search .................. 719/310, 719/313, 318, 328, 311, 317; 709/206, 226, 709/203, 231, 202, 238; 701/10, 101
See application file for complete search history.

(56) References Cited

U.S. PATENT DOCUMENTS

| | | | |
|---|---|---|---|
| 5,339,434 A | | 8/1994 | Rusis |
| 5,410,675 A | | 4/1995 | Shreve et al. |
| 5,493,671 A | | 2/1996 | Pitt et al. |
| 5,539,787 A | | 7/1996 | Nakano et al. |
| 5,581,558 A | | 12/1996 | Horney, II et al. |
| 5,708,828 A | | 1/1998 | Coleman |
| 5,793,771 A | | 8/1998 | Darland et al. |
| 5,815,689 A | | 9/1998 | Shaw et al. |
| 6,094,684 A | | 7/2000 | Pallmann |
| 6,111,893 A | | 8/2000 | Volftsun et al. |
| 6,256,676 B1 * | 7/2001 | Taylor et al. .................. 709/246 |
| 6,289,382 B1 | | 9/2001 | Bowman-Amuah |
| 6,332,163 B1 * | 12/2001 | Bowman-Amuah .......... 709/231 |
| 6,339,832 B1 | | 1/2002 | Bowman-Amuah |
| 6,393,494 B1 | | 5/2002 | Hyder et al. |
| 6,453,356 B1 * | 9/2002 | Sheard et al. ................. 709/231 |
| 6,529,963 B1 * | 3/2003 | Fredin et al. ..................... 710/1 |
| 6,658,630 B1 | | 12/2003 | Threatt et al. |
| 6,665,685 B1 | | 12/2003 | Bialic |
| 6,738,975 B1 | | 5/2004 | Yee et al. |

(Continued)

FOREIGN PATENT DOCUMENTS

WO    WO-02/096057 A2    11/2002

(Continued)

OTHER PUBLICATIONS

International Search Report and Written Opinion issued for PCT/US05/36785; Dated Jan. 14, 2008; 10 Pages.

(Continued)

*Primary Examiner* — Van Nguyen
(74) *Attorney, Agent, or Firm* — Dawn-Marie Bey; King & Spalding LLP

(57) ABSTRACT

Disclosed are systems and methods which provide an interface for software applications which provides intelligent routing of data between the software applications. Embodiments provide an interface between software applications using multiple adapters, wherein at least one adapter is associated with each end of a software application information communication link. Information communicated between software applications is routed based upon analysis of the information and/or associated transactions to provide dynamic interfacing between software applications. Information may be routed based upon content, transaction type, historical information, etcetera. Routing of information of embodiments establishes an itinerary for scheduling communication of information between a plurality of software applications.

29 Claims, 3 Drawing Sheets

U.S. PATENT DOCUMENTS

| | | | |
|---|---|---|---|
| 6,757,689 B2 | 6/2004 | Battas et al. | |
| 6,792,431 B2 * | 9/2004 | Tamboli et al. | 707/102 |
| 6,954,757 B2 * | 10/2005 | Zargham et al. | 707/101 |
| 6,959,340 B1 | 10/2005 | Najmi | |
| 7,136,857 B2 * | 11/2006 | Chen et al. | 707/10 |
| 7,171,459 B2 | 1/2007 | Sanghvi et al. | |
| 7,617,328 B2 * | 11/2009 | Lewis et al. | 709/246 |
| 2002/0026630 A1 | 2/2002 | Schmidt et al. | |
| 2002/0046301 A1 | 4/2002 | Shannon et al. | |
| 2002/0116454 A1 * | 8/2002 | Dyla et al. | 709/203 |
| 2002/0143819 A1 | 10/2002 | Han et al. | |
| 2002/0156664 A1 | 10/2002 | Willcox et al. | |
| 2002/0156693 A1 | 10/2002 | Stewart et al. | |
| 2002/0161859 A1 | 10/2002 | Willcox et al. | |
| 2003/0093403 A1 * | 5/2003 | Upton | 707/1 |
| 2003/0093470 A1 * | 5/2003 | Upton | 709/203 |
| 2003/0105884 A1 * | 6/2003 | Upton | 709/318 |
| 2003/0109271 A1 * | 6/2003 | Lewis et al. | 455/517 |
| 2003/0120593 A1 | 6/2003 | Bansal et al. | |
| 2004/0148357 A1 | 7/2004 | Corrigan et al. | |
| 2005/0015439 A1 * | 1/2005 | Balaji et al. | 709/203 |
| 2005/0015741 A1 | 1/2005 | Langkafel et al. | |
| 2005/0091663 A1 | 4/2005 | Bagsby | |
| 2005/0102683 A1 * | 5/2005 | Branson et al. | 719/328 |
| 2006/0059230 A1 * | 3/2006 | Dykas et al. | 709/206 |
| 2006/0168199 A1 | 7/2006 | Chagoly et al. | |

FOREIGN PATENT DOCUMENTS

WO  WO-03/050676 A2  6/2003

OTHER PUBLICATIONS

International Search Report and the Written Opinion issued for PCT/US2005/036696, dated Jul. 25, 2007, 11 pages.

International Search Report and the Written Opinion issued for PCT/US2005/036782, dated Feb. 13, 2007.

International Search Report and the Written Opinion issued for PCT/US2005/37124, dated Feb. 26, 2007.

* cited by examiner

SYSTEMS AND METHODS PROVIDING INTELLIGENT ROUTING OF DATA BETWEEN SOFTWARE SYSTEMS

CROSS-REFERENCE TO RELATED APPLICATIONS

The present invention is related to co-pending and commonly assigned U.S. patent application Ser. No. 10/965,253, filed Oct. 14, 2004, entitled "INTERFACING DISPARATE SOFTWARE APPLICATIONS," U.S. patent application Ser. No. 10/965,254, filed Oct. 14, 2004, entitled "CENTRALIZED MANAGEMENT OF SOFTWARE ADAPTERS," and U.S. patent application Ser. No. 10/964,902, filed Oct. 14, 2004, entitled "ANOMALY DETECTOR IN A HEALTH CARE SYSTEM USING ADAPTER," each of which is concurrently filed herewith and the disclosures of which are hereby incorporated herein by reference.

TECHNICAL FIELD

The present invention relates generally to providing interfacing between software systems and, more particularly, to providing intelligent routing of data between such software systems.

BACKGROUND OF THE INVENTION

Enterprises, such as business enterprises, governmental enterprises, and private enterprises, often employ a number of systems (whether hardware, software, or combinations thereof) for providing functionality useful to the operation of the enterprise. For example, an enterprise may employ a complex computer network and communication system in order to facilitate information communication, processing, storage, analysis, modeling, etcetera. The aforementioned computer network may provide desired functionality through the use of various software systems, such as may comprise one or more software applications (referred to herein as applications) addressing particular aspects of the enterprise operations.

As but one example, for an enterprise providing healthcare services such applications may include a case management application, a credentialing application, a financial application, a membership management application, a commissions application, a customer service application, a provider network management application, a claims processing application, etcetera. Efficient operation of the enterprise may suggest that information from one or more such application should be exchanged (advantageously in real-time) with another one or more such application. However, each such application may utilize proprietary data formats, incompatible data inputs/outputs, or otherwise present barriers to their directly interfacing for desired information exchange making these applications not only disparate with respect to function but also disparate with respect to interfacing.

Further compounding the difficulties associated with the ability to provide information exchange between such an enterprise's applications, an enterprise may utilize more than one of any or all of the foregoing applications, wherein one or more applications providing a same or similar function may also be disparate. For example, a healthcare services enterprise may acquire or merge with another healthcare services enterprise, each having a number of systems, including different ones of the foregoing applications, for providing functionality useful to the operation of the enterprise. Thus, for example, an insurer (an example of a healthcare services enterprise) may comprise a plurality of disparate claims processing applications. Migration to one platform is likely to be costly and time consuming, thereby resulting in various legacy applications being used in parallel with other applications providing the same or similar functionality.

Approaches to providing integration between enterprise applications have included enterprise application integration (EAI) efforts which typically result in an EAI application uniquely tailored to a situation to provide interfacing between a plurality of specific enterprise applications. For example, an EAI application will typically be adapted to interface with particular enterprise applications and will provide a data path between particular ones of these applications (e.g., point-to-point interfacing). EAI applications have provided enterprise application interfacing in batch processing modes or in real-time processing modes, but heretofore have not offered a combination of batch processing and real-time processing.

EAI applications are generally a centralized application requiring considerable resources and manpower to operate and maintain. Although the software applications themselves often provide stable and reliable operation, EAI applications tend to be less stable and present reliability issues with respect to the application interfaces provided thereby failing or degrading. There has heretofore been no ability to monitor the performance of interfaces provided by EAI applications or to validate that they are working, without an operator actually monitoring the operation of the interfaces.

Moreover, EAI applications typically adopt a "stove pipe" configuration wherein they implement proprietary data interchange architecture and are adapted for use with only specific applications. If an enterprise, using a typical EAI application to provide interfacing between applications, changes, adds, or removes an application, the interface provided will be broken. Therefore, the EAI application will require corresponding modification, such as to add a new interface or modify an existing interface in order to support changes with respect to the enterprise applications. Such EAI application modifications are typically costly and time consuming, resulting in a reluctance, or an inability, to implement enterprise application changes.

The "stove pipe" configuration of EAI applications presents a "hard wired" interface between software applications in that data, or particular data, provided by a first software application is directed to a second software application in accordance with hard coding of an interface provided by the EAI application. If it is later desired to route data from the first software application to a third software application, the EAI application must be modified to create a new interface or modify an existing interface.

Moreover, stove pipe configurations of EAI applications can only provide limited routing of data based upon transaction information. For example, although an EAI application may be hard coded to make a simple determination as to a routing branch determination based upon limited information, such routing is based upon proprietary technology and has not provided robust and flexible intelligent routing based upon a large variety of transaction information. When it is determined that alternative routing of data between applications is desired, a highly technical individual must typically be employed to make code changes to the EAI application.

Accordingly, a need exists in the art for a software application interface which is more easily supported. A further need exists in the art for a software application interface which provides flexibility. A still further need exists in the art for a software application interface which supports intelligent routing based upon a variety of transaction information.

BRIEF SUMMARY OF THE INVENTION

The present invention is directed to systems and methods which provide an interface for software applications which provides intelligent routing of data between the software applications. Intelligent routing provided according to embodiments of the invention facilitates dynamically routing transactions from one application to one or more applications based on any element of the associated transaction or any combination of elements of the associated transaction. Embodiments of the invention provide an interface between software applications using multiple software modules (referred to herein as adapters). Preferably at least one adapter is associated with each end of a software application information communication link.

Adapters of a preferred embodiment of the present invention provide a decentralized architecture using a common communication bus protocol. For example, each adapter of an embodiment is adapted for proprietary data communication with one or more associated application, thereby providing information communication suitable for establishing an end of a software application information communication link. Additionally, each adapter of the foregoing embodiment is adapted for data communication with other adapters using protocols common to each such adapter. According to a preferred embodiment of the present invention, the common protocols utilized in inter-adapter communications comprise an open or standardized protocol, such as the extensible markup language (XML), simple object access protocol (SOAP), web services description language (WSDL), universal description, discovery and integration (UDDI), as a common communication bus protocol. For example, web services protocols, providing a standardized way of integrating web-based applications, may be used according to some embodiments of the invention.

Information communication provided between software applications using adapters of embodiments of the present invention may be provided in batch mode, in real-time mode, or in both batch and real-time modes. Real-time information communication may be provided by invoking requests or calls between adapters, and correspondingly between applications. For example, an embodiment of the present invention implements a web services module to facilitate an open architecture real-time information communication platform supporting calls between adapters. Batch information communication may be provided through publishing information by one or more adapter. For example, an adapter may monitor an associated software application for an event, such as a particular transaction or type of transaction, and after such an event is detected publish information regarding the event for other software applications to consume (via one or more adapter). The foregoing information may be published in a number of different ways according to embodiments of the present invention, such as to a database, to a message queue, to a flat file, etcetera. An application (or adapter associated therewith) requesting the information from another application can specify how the information is to be published, according to embodiments of the invention. Moreover, using adapters of the present invention, embodiments support various publication types, even though the application from which the information is published may not support the requested publication type (e.g., device type to which the information is published, format of the publication, the way in which the information is published, etcetera).

Adapters of embodiments of the invention are associated with or specifically designed for an enterprise function or "business process" basis, rather than having a one-to-one association with the applications for which interfacing is provided. For example, embodiments of the present invention provide adapters for use in healthcare services enterprises, such as may employ one or more case management application, credentialing application, financial application, membership management application, commissions application, customer service application, provider network management application, claims processing application, etcetera. However, rather than providing an adapter for each such application, embodiments of the present invention provide adapters for particular business processes or functions facilitated using one or more of the foregoing applications. For example, two or more adapters may be associated with a business process for payment adjudication, wherein this business process may involve various applications such as a financial application, commissions application, and claims processing application.

Adapters of embodiments of the present invention may be utilized in providing interfaces with respect to a plurality of applications providing a same or similar function. For example, adapters associated with a business process for payment adjudication may provide interfacing with respect to a plurality of claims processing applications, such as may include legacy systems as well as core systems.

A plurality of adapters may be utilized with respect to any particular software application according to embodiments of the invention. Likewise, a plurality of software applications may be associated with any particular adapter according to embodiments of the invention.

Using adapters of embodiments of the present invention, software applications may be changed, e.g., added, replaced, removed, etcetera, without affecting many of the information communication links. Additionally, such changed applications may be readily accommodated by providing an adapter or adapters configured for information communication with the changed application without changing other adapters used according to the present invention. The particular adapters affected by a changed application may include a plurality of adapters associated with business processes or functions provided by the changed application. To update an adapter to account for a change in the associated application, a programmer need only be familiar with the interface to the associated application and the generic format used with respect to the common communication bus. The programmer need not be familiar with the interface to other applications with which the associated application is to interface, or event the particular applications the associated application is to interface.

Adapters of embodiments of the invention provide information communication with modules or systems in addition to the aforementioned software applications and other adapters of an information communication interface. For example, adapters may provide information communication with an external agent module which provides operation and/or performance monitoring with respect to the agents. Such monitoring may be utilized to determine if the interface provided by corresponding agents is operational and performing to a desired level. Additionally or alternatively, such monitoring may be utilized to determine if individual adapters are operational and/or performing as desired. Likewise, adapters may provide information communication with logging modules, such as may compile a historical log of adapter operation, interface operation, information communication provided by interfaces, etcetera. Logs provided according embodiments of the present invention provide a record of transactions performed or attempted to be performed using an interface as described herein. Such transaction logs are particularly useful with respect to determining if a particular transaction has been properly completed as well as to determine if a particular transaction has already been performed.

Interfaces provided between software applications according to embodiments of the present invention provide for intelligent routing of data. For example, the aforementioned adapters of embodiments of the invention provide content based routing, such as based upon routing rules, to determine appropriate software applications for providing particular data to from other software applications. Accordingly, interfaces of the present invention dynamically, and in real-time, route data between software applications as is appropriate for the data being routed, the transaction being conducted, the business process being performed, etcetera. Such content based or intelligent routing may deliver data from a first software application to one or more other software applications, including different software applications depending upon particular criteria. For example, depending upon such criteria as the time of the transaction, the particular content of data or combination of data (e.g., a particular service code used in combination with a particular personal identification number), historical data (e.g., a number of times a particular service code has been used with respect to a particular individual within a predetermined time period), etcetera, interfaces of the present invention may provide data from a first software application to various other software applications or combinations thereof.

Embodiments of the present invention additionally or alternatively provide intelligent routing of data wherein a data routing itinerary is implemented. For example, depending upon the particular data being routed, the particular transaction being conducted, the business process being performed, etcetera, an itinerary for routing the data, or portions thereof, to a plurality of software applications in a particular order or sequence. For example, an interface of an embodiment of the invention may determine that particular data is to be routed from a first software application to a second software application and then to a third software application. Routing of the data to such a third software application may implement a delay, such as to allow the second software application to process the data, before the data is provided to the third software application according to an itinerary implemented by the interface. Routing of data to one or more subsequent software applications may be time or event based. For example, an itinerary implemented by an interface of one embodiment may route data from a first software application to a second software application and await a predetermined event or a predetermined period of time before routing the data to a third software application. Routing itineraries may be responsive to particular events, or the lack thereof. For example, an interface may await a predetermined time after routing data to a second application program before further routing according to an itinerary and, depending upon whether a particular event occurred with the second software application during this time, route the data to a third or fourth software application.

Any of the foregoing intelligent routing techniques may implement one or more sets of routing rules, such as may correlate any element of a transaction or any combination of elements of a transaction to one or more applications, to one or more adapters, to one or more business processes, etcetera. Routing rules implemented according to a preferred embodiment are configured by a business user, or other user with an understanding of the business process and/or other enterprise function to which transactions having information routed between applications according to the present invention apply. Accordingly, routing rules of embodiments of the present invention are defined in "plain language" or are otherwise adapted to facilitate their being understood by non-technical users. Rules of a routing rule set of an embodiment of the invention are comprised of a qualifier which determines which transactions qualify for the rule and a routing action which defines the route for the transaction. The aforementioned route may identify applications, adapters, business processes, workflow queues, trading partners, and/or the like to which particular information is to be routed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
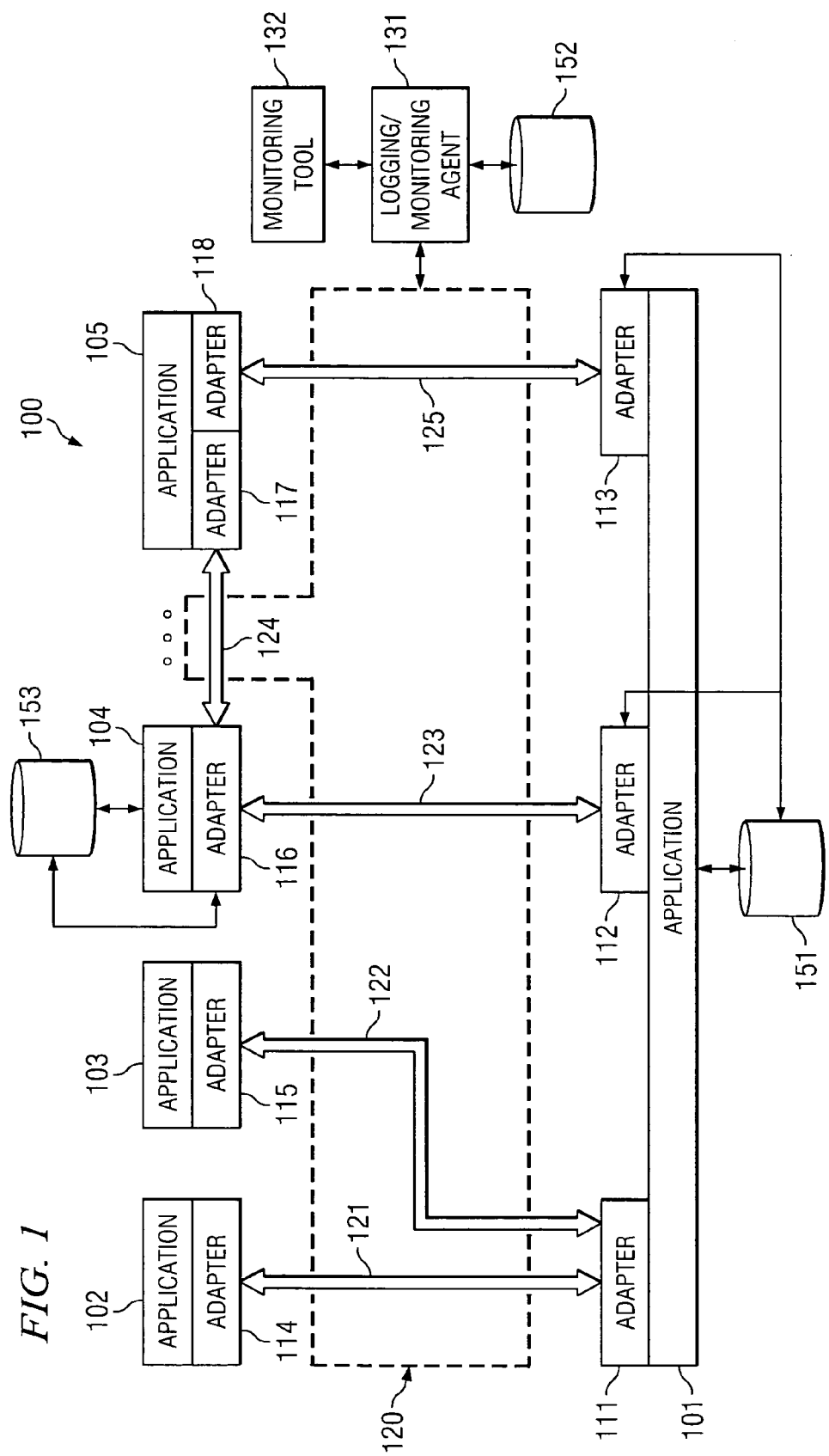
FIG. 1 shows a high level block diagram of an enterprise system adapted for inter-application information communication according to an embodiment of the present invention.

Directing attention to FIG. 1, a high level block diagram of enterprise system 100 in which interfaces are provided between disparate applications using a decentralized adapter architecture according to an embodiment of the present invention is shown. Enterprise system 100 of FIG. 1 includes a plurality of applications, shown here as applications 101-105. Applications 101-105 may provide various functions useful to the operation of an enterprise and may include multiple applications providing the same or similar functions, applications providing various aspects of particular functions, applications providing unrelated functions, etcetera. For example, where an enterprise associated with enterprise system 100 provides healthcare services, applications 101-105 may comprise one or more managed care payer administration application, case management application, credentialing application, financial application, etcetera. Applications 101-105 may utilize a number of different resources, such as database 151 associated with application 101 and database 153 associated with application 104, in providing the aforementioned functions.

Interfaces are provided between applications 101-105 according to the illustrated embodiment using adapters 111-118. As shown in FIG. 1, adapters 101-105 are associated with one or more information communication link, ones of which are illustrated as links 121-125, providing inter-application communication. Accordingly, a plurality of adapters and one or more links therebetween provide an interface between applications according to the illustrated embodiment. It should be appreciated, therefore, that an interface is not limited to a single link and corresponding adapters. Likewise, adapters are not limited to use with respect to a single link.

Adapters of embodiments of the present invention comprise instruction sets (e.g., software code) operable upon a processor based system. For example, an adapter of an embodiment of the present invention comprise one or more software modules operable upon a host system (e.g., server system) upon which an associated application is operable.

Adapters 111-118 of preferred embodiments are adapted to interact with one or more of applications 101-105 and therefore include logic for facilitating input and/or output of information from associated ones of applications 101-105. For example, each adapter of an embodiment is adapted for proprietary data communication with an associated application of applications 101-105, thereby providing information communication suitable for establishing an end of an inter-application interface. Such proprietary data communication may include protocols, data formats, signaling, etcetera unique to interaction with the associated application. Additionally or alternatively, adapters 111-118 may be adapted to interact with resources of an associated application. For example, adapters of embodiments of the present invention interact with a database of an associated application, such as databases 151 and 153, to facilitate information communication between applications. Such interaction with these resources may be to obtain data for information communication, to determine a time and/or content of information communication, etcetera.

Each of adapters 111-118 of preferred embodiments are adapted to communicate with any of adapters 111-118. For example, each of links 121-125 of preferred embodiments implement a same or common information communication protocol, thereby providing common communication bus 120 facilitating communication between any and all of adapters 111-118. According to a preferred embodiment of the present invention, adapters 111-118 use an open or standardized protocol, such as XML, SOAP, WSDL, UDDI, etcetera, and combinations thereof, for the foregoing communications. For example, adapters 111-118 may use web services protocol, comprising a combination of XML, SOAP, WSDL, and UDDI, for inter-adapter communications.

It should be appreciated that common communication bus 120 of embodiments of the present invention may utilize any of a number of physical media for information communication. Where applications of enterprise system 100 are operable within a same host computer, for example, common communication bus 120 may utilize data busses of the computer system for information communication as described herein. As another example, where applications of enterprise system 100 are operable upon different host computers, common communication bus 120 may utilize network (e.g., local area network (LAN), metropolitan area network (MAN), wide area network (WAN), intranet, extranet, the Internet, public switched telephone network (PSTN), cable transmission, satellite) or other data links for information communication as described herein.

Common communication bus 120 of the illustrated embodiment facilitates creation of and modification to interfaces between applications 101-105. For example, because each of adapters 111-118 of embodiments are capable of communicating with any other of adapters 111-118 through common communication bus 120, new links may readily be added to or replace links 121-125 to provide a new or different interface. Likewise, adapters may be readily added to enterprise system 100 to provide new and different interfaces between an added adapter and one or more of adapters 111-118. Additionally or alternatively, when it becomes desirable to replace an adapter of adapters 111-118, such as when an application of applications 101-105 is changed or replaced, common communication bus 120 facilitates replacing such an adapter without the need to alter any other adapters or links of enterprise system 100.

The illustrated embodiment of enterprise system 100 includes logging/monitoring agent 131 operable to communicate with one or more of adapters 111-118. For example, logging/monitoring agent 131 may communicate with each of adapters 111-118 via common communication bus 120 to monitor the operation of each such adapter, to monitor the status of interfaces provided by such adapters, to monitor the performance of interfaces, and/or the like. Logging/monitoring agent 131 may provide monitored information to monitoring tool 132, such as to apprise a system operator of current status and/or alarm conditions. Additionally or alternatively, logging/monitoring agent 131 may compile a historical log of adapter operation, interface operation, information communication provided by interfaces, and/or the like. Such information may be stored in a transaction log database, such as database 152, for analysis or later use. Such transaction logs are particularly useful with respect to determining if a particular transaction has been properly completed as well as to determine if a particular transaction has been performed.

Figure 2:
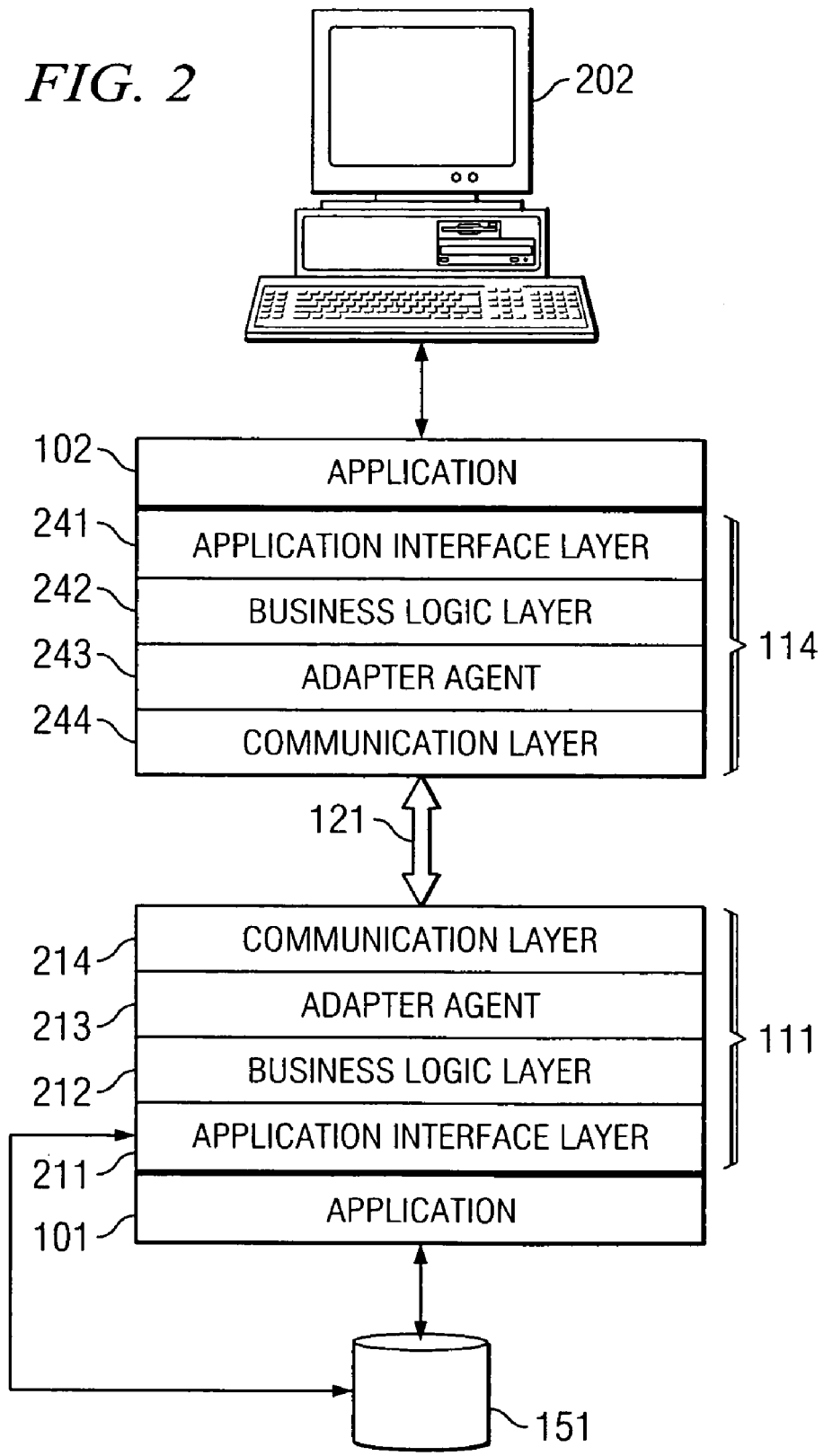
FIG. 2 shows additional detail with respect to an embodiment of adapters as shown in FIG. 1.

FIG. 2 shows additional detail with respect to adapters utilized in providing an interface between applications according to an embodiment of the present invention. Specifically, detail with respect to adapters 111 and 114, providing an interface between applications 101 and 102, of FIG. 1 are shown in FIG. 2.

As can be seen in the exemplary configuration of FIG. 2, adapters of embodiments of the present invention comprise a layered configuration. Specifically, in the illustrated embodiment adapter 111 comprises layers 211-214 and adapter 114 comprises layers 241-244, corresponding to an application interface layer, a business logic layer, an adapter agent layer, and a communication layer, respectively, interacting to provide functionality as described herein. Alternative embodiments of the invention may include more or fewer layers (including a single layer), and layers thereof may provide functionality in addition to or in the alternative to that described with respect to the illustrated embodiment.

An application interface layer, e.g., application interface layers 211 and 241, of embodiments provides arbitration between an associated application's proprietary input/output format and data structure and a data structure of the common communication bus. For example, application interface layer 211 may facilitate interaction with application 101 to identify particular information within the application, to input and/or extract appropriate information, and to convert information between a proprietary format of application 101 and a format of common communication bus 120. Application interface layer 211 may input and/or extract the foregoing information from resources of application 111, such as database 151, in addition to or in the alternative to interacting directly application 111, if desired.

A business logic layer, e.g., business logic layers 212 and 242, of embodiments provides arbitration of particular business processes into objects for fulfilling functions supported by adapters of embodiments of the present invention. Adapters of embodiments of the invention are associated with an enterprise function or "business process." Accordingly, embodiments of the present invention provide adapters 111-118 for particular business processes or functions facilitated using one or more of applications 101-105. A particular business process may implicate particular information associated with a plurality of applications. A business logic layer of embodiments of the present invention will identify the information implicated, the applications associated with the information, and steps or a process used to implement the business process as between the plurality of applications to appropriately exchange information using the aforementioned objects. In operation, a business logic layer of a preferred embodiment receives data in a standard format (either from an application via an application interface layer or from another adapter via a communication layer), determines what part of that data is to be ignored and which part of that data is to be used for the business process as implicates the interface provided, transforms that portion of data as suitable for providing to an application or another adapter to accomplish the business process.

Business logic layers of embodiments of the invention may additionally provide routing information, such as to indicate that an information object is to be published, to identify one or more adapters or applications to which information objects are to be communicated, and/or to establish an itinerary for providing an information object, or portion thereof, to adapters or applications in a particular order or according to a schedule. Routing information may be determined based upon various criteria, such as the information content, the business process being performed, the particular function, the time of the transaction, historical data, etcetera. Such routing information may identify adapters and/or applications by a class, type, or a function performed. Alternatively, such routing information may specifically identify a particular adapter or application. Preferred embodiments, however, implement an information object routing technique which does not rely upon identification of particular adapters or applications to which such information is to be routed. For example, business logic of adapters of preferred embodiments is self aware of the functions supported thereby (or by an associated application) and thus may consume information objects having an associated function object for which functions are supported by the adapter or an associated application.

For example, a business logic layer of an embodiment of the present invention may implement one or more sets of routing rules for providing routing information used with respect to information objects. Such routing rules may correlate any element of a transaction or any combination of elements of a transaction to one or more applications, to one or more adapters, to one or more business processes, etcetera. Rules of a routing rule set of an embodiment of the invention are comprised of a qualifier which determines which transactions qualify for the rule and a routing action which defines the route for the transaction. The aforementioned route may identify applications, adapters, business processes, workflow queues, trading partners, and/or the like to which particular information is to be routed.

The objects utilized by business logic layers of an embodiment are preferably standardized to facilitate predictable interaction between adapters. Objects utilized according to embodiments of the invention define the type of information that the adapter will be transforming, types of methods that the adapter will perform, etcetera. For example, an information object may be defined as "member" having an information structure including information for a member (e.g., name, address, phone number, account number, etcetera) stored by an associated application. Similarly, an information object may be defined as "transaction" having an information structure which includes information for a transaction (e.g., member name, service provider, date of services, type of services, etcetera) stored by an associated application. Additionally, a function object may be defined as "delete" which includes steps associated with a record deletion in an associated application.

Although any number and type of objects may be utilized according to embodiments of the invention, objects used are preferably shared among adapters. For example, each adapter associated with applications for which member information is stored may implement a "member" information object, although the actual information (in content and the fields included in the structure) may vary from application to application. Likewise, each adapter associated with applications for which particular functions (e.g., delete, add, update, final, etcetera) are to be invoked have a corresponding function object, although the particular steps performed by the function objects may vary from application to application. Accordingly, objects of preferred embodiments operate to convert information between a generic information structure and a structure utilized by a business process in a particular application (information objects) and to convert generic functions to functions utilized by a business process of a particular application (function objects). In view of the above, the data and the functions (e.g., delete, add, etcetera) are transformed between an application-specific format to a generic format. Further, the functions (business logic) to be implemented in a given adapter may be selected on a per business process (or "business cycle") basis, as described further herein.

In operation according to embodiments of the invention, business logic layer 212 transforms requests and other outputs of application 101, provided in a standardized format by application interface layer 211, into standardized objects understandable to other adapters, such as to satisfy a request or otherwise appropriately consume the output. Similarly, business logic layer 212 transforms responses and other inputs to application 101, provided in a standardized format by a corresponding interface layer (e.g., interface layer 241) and/or as a standardized object by a corresponding business logic layer (e.g., business logic layer 242), into information in the appropriate format understandable to application 101, such as to provide a response to a previous request or otherwise appropriately use the input.

The foregoing business processes may be of various scales. For example, adapters of embodiments of the present invention may be associated with business processes on a small or micro-scale, such as may include processes associated with a single data record, individual, transaction, or event. Micro-scale business processes of one embodiment include relatively simple processes such as add a new patient, add a new provider, change an address, query an individual's information, post a payment to an account, retrieve detail for a particular claim, and the like. Adapters of embodiments of the present invention may additionally or alternatively be associated with business processes on a large or macro-scale, such as may include processes associated with multiple data records, individuals, transactions, or events. Macro-scale business processes of one embodiment include relatively complex processes such as process claims, adjudicate claims, period end processing, import data, global updates, and the like.

The illustrated embodiment of FIG. 2 includes an adapter agent layer, e.g., adapter agent layers 213 and 243. Adapter agent layers of preferred embodiments facilitate monitoring and/or transaction logging. For example, an external logging/monitoring agent, such as logging/monitoring agent 131 of FIG. 1, may communicate with adapter agent layers of each adapter validate that each such adapter is operating as well as to monitor transactions performed by the adapters. Preferred embodiment adapter agent layers are disposed above the aforementioned business logic layer to facilitate transaction logging, such as through monitoring particular objects communicated by or consumed by an associated adapter. Additionally, preferred embodiment adapter agent layers are disposed below a communication layer to facilitate monitoring of the performance of interface provided by an associated adapter to validate that the interface is working and/or to monitor performance metrics associated with its operation. An adapter agent layer may be omitted from embodiments wherein monitoring and/or transaction logging is not desired.

Adapter agent layers of embodiments of the invention may additionally provide routing information, such as to indicate that an information object is to be published, to identify one or more adapters or applications to which information objects are to be communicated, and/or to establish an itinerary for providing an information object, or portion thereof, to adapters or applications in a particular order or according to a schedule. For example, where the above mentioned business logic layer provides transformation of information into standardized information objects without providing routing information, an adapter agent layer of one embodiment provides such routing information. Routing information may be determined based upon various criteria, such as the information content, the business process being performed, the particular function, the time of the transaction, historical data, etcetera Such routing information may identify adapters and/or applications by a class, type, or a function performed. Alternatively, such routing information may specifically identify a particular adapter or application. Preferred embodiments, however, implement an information object routing technique which does not rely upon identification of particular adapters or applications to which such information is to be routed. For example, adapters of preferred embodiments are self aware of the functions supported thereby (or by an associated application) and thus may consume information objects having an associated function object for which functions are supported by the adapter or an associated application.

For example, an adapter agent layer of an embodiment of the present invention may implement one or more sets of routing rules for providing routing information used with respect to information objects. Such routing rules may correlate any element of a transaction or any combination of elements of a transaction to one or more applications, to one or more adapters, to one or more business processes, etcetera. Rules of a routing rule set of an embodiment of the invention are comprised of a qualifier which determines which transactions qualify for the rule and a routing action which defines the route for the transaction. The aforementioned route may identify applications, adapters, business processes, workflow queues, trading partners, and/or the like to which particular information is to be routed.

A communication layer, e.g., communication layers 214 and 244, of embodiments provides for communication with other adapters. Communication provided by the communication layers of preferred embodiments is in a same or common information communication protocol to provide a common communication bus, such as common communication bus 120 of FIG. 1. The foregoing common information communication protocol may be provided using a web services architecture. It should be appreciated that adding new or modified adapters to an enterprise system using adapters having a communication layer as illustrated, providing a common communication bus, is simplified due to each adapter communicating via the common communication bus. Accordingly, adapters may be readily added as new applications are added/changed and/or as business processes are added/changed.

Communication layers of embodiments of the invention may provide inter-adapter communication in a number of ways. For example, communication may be provided in real-time to establish a real-time interface between applications, such as may be useful in low-latency or no latency (e.g., interactive) processing of transactions or queries which involve multiple applications. Additionally or alternatively, communication may be provided in batch to establish a periodic interface between applications, such as may be useful in accumulated or high-volume processing of transactions or records which involve multiple applications.

Embodiments of the present invention employ communication layers which support various communication paradigms. For example, communication layers may implement a web services architecture to provide communication in response to requests (e.g., a request as issued by an associated application or adapter) and responses (e.g., a response to a previous request as issued by an associated application or adapter). Additionally or alternatively, communication layers may implement a publishing or messaging services architecture to push information to one or more destinations, such as upon the occurrence of an event, periodically, or based upon other triggers. Such information may be published directly to one or more consuming adapters or the information may be published to a data store, such as database 152 of FIG. 1, accessible to one or more consuming adapters.

Communications layers of embodiments of the present invention may include routing logic, such as to determine routing information. For example, rather than business logic and/or adapter agent layers of the invention providing routing information, as described above, communication layers of an embodiment may determine routing information to indicate that an information object is to be published and/or to identify one or more adapters or applications to which information objects are to be communicated. Irrespective of the particular layer providing routing information, communications layers of embodiments of the invention facilitate routing of information objects in accordance with routing information provided with respect information objects. A plurality of communications layers may cooperate to provide routing of information according to embodiments of the present invention. For example, routing information associated with a particular information object may indicate an itinerary for routing the information object to a series of applications, whereby a communication layer of an adapter associated with a first application routes the information object and associated routing information to a second application as indicated in the itinerary. Thereafter, a communication layer of an adapter associated with the second application uses the routing information to route the information object to a third application, when and if appropriate.

From the above description of layers of a preferred embodiment adapter, it should be appreciated that routing rules according to embodiments of the invention comprise a plurality of components. For example, routing rules utilized in routing information objects as described above include a qualifier component operable to determine which transactions or particular information objects qualify for which routing rules and a routing component operable to provide routing information in accordance with the routing information. In addition to the foregoing qualifier component and routing component, one or more component (e.g., a communication component) may implement routing of information objects in accordance with the aforementioned routing information. The foregoing components may be provided in different layers of an adapter according to embodiments of the present invention. According to embodiments of the invention, a qualifier component and routing component may be provided in a business logic and/or adapter agent, while a component implementing information object routing is provided in a communication layer. However, embodiments of the invention may implement the foregoing components in a same layer, such as implementing both the qualifier component and the routing component in an adapter communication layer.

Figure 3:
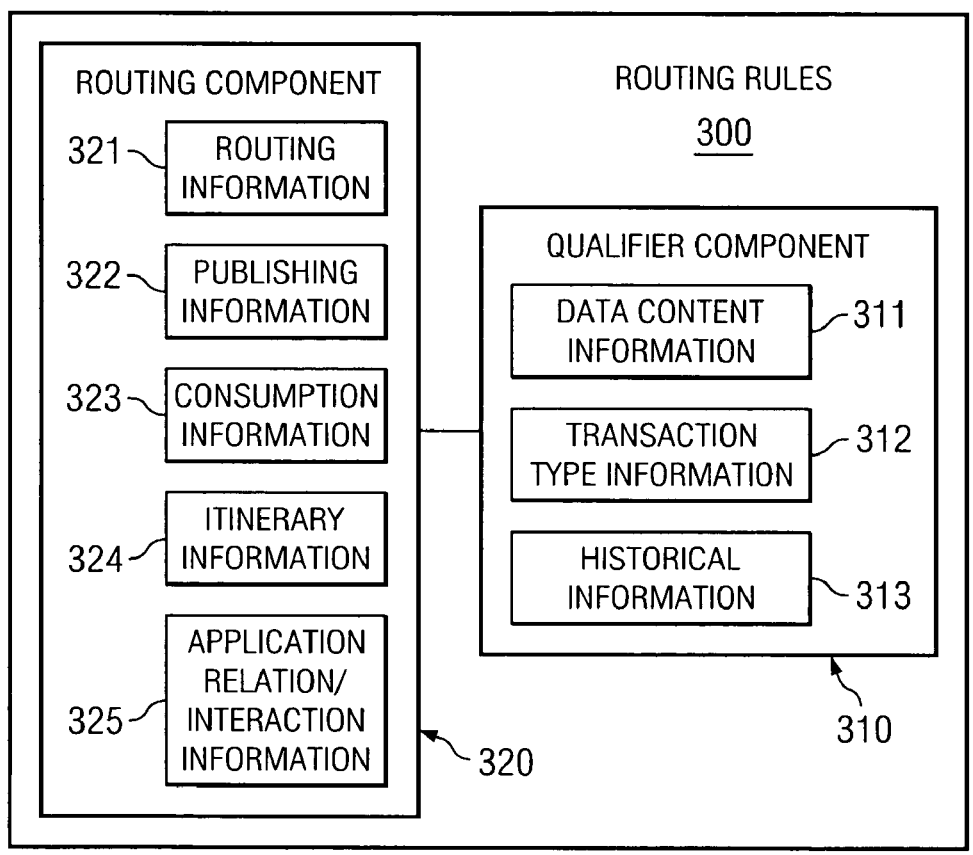
FIG. 3 shows a block diagram of a routing rules module implemented with respect to adapters of an embodiment of the present invention.

Directing attention to FIG. 3, a block diagram of routing rules as may be implemented within any or all of adapters 111-118 is shown as routing rules 300. Routing rules implemented according to a preferred embodiment are configured by a business user, or other user with an understanding of the business process and/or other enterprise function to which transactions having information routed between applications according to the present invention apply. Accordingly, routing rules of embodiments of the present invention are defined in "plain language" or are otherwise adapted to facilitate their being understood by non-technical users.

Routing rules 300 of the illustrated embodiment includes qualifier component 310 and routing component 320, such as may comprise code of a business logic or adapter agent layer of an adapter. Qualifier component 310 of an embodiment determines which transactions qualify for the rule. Routing component 320 of an embodiment defines the route for the information object to result in information being provided to appropriate applications.

Qualifier component 310 of the illustrated embodiment includes various information utilized in determining if particular information objects qualify for application of particular routing rules. It should be appreciated that determinations with respect to qualification for application of routing rules may be made on an information object by information object basis, on a transaction by transaction basis (e.g., all information objects associated with a particular transaction are qualified for a same routing rule), on an application by application basis (e.g., all information objects associated with a particular application are qualified for a same routing rule), etcetera.

Qualifier component 310 of the illustrated embodiment includes data content information 311, transaction type information 312, and historical information 313, any or all of which may be utilized with respect to a particular information object in determining which, if any, of a plurality of routing rules the information object qualifies for. Data content information 111 may include information with respect to particular information object content (e.g., information, information types, etcetera) for which one or more routing rules applies. Transaction type information 312 may include information with respect to particular transactions (e.g., transactions, transaction types, etcetera) for which one or more routing rules applies. Historical information 313 may include information with respect to particular histories associated with information content and/or transactions (e.g., a number of particular past transactions associated with a particular individual, a number of times a particular transaction has been performed, whether a particular transaction has preceded a current transaction, etcetera) for which one or more routing rules applies. Detail with respect to a qualifier component's use of information, such as provided by data content information 311, transaction type information 312, and historical information 313 of the illustrated embodiment, is provided below with reference to operation of an exemplary embodiment.

Routing component 320 of the illustrated embodiment includes various information utilized in implementing appropriate routing for a particular information object. Specifically, routing component 320 of the illustrated embodiment includes routing information 321, publishing information 322, consumption information 323, itinerary information 324, and application relation/interaction information 325, any or all of which may be utilized with respect to a particular information object in implementing appropriate routing with respect thereto.

Routing information 321 may include information to be associated with a particular information object, a particular type of information object, a particular class of information objects, a particular transaction, a particular type of transaction, etcetera, as qualified by qualifier component 310, used in routing information objects. Publishing information 322 may include information with respect to a particular information object, a particular type of information object, a particular class of information objects, a particular transaction, a particular type of transaction, etcetera, as qualified by qualifier component 310, indicating how, when, and/or where information objects are to be published. Consumption information 323 may include information with respect to a particular information object, a particular type of information object, a particular class of information objects, a particular transaction, a particular type of transaction, etcetera, as qualified by qualifier component 310, indicating a particular adapter and/or application is a consumer of such information objects routed to/from routing component 320. Itinerary information 324 may include information associated with a particular information object, a particular type of information object, a particular class of information objects, a particular transaction, a particular type of transaction, etcetera, as qualified by qualifier component 310, used in routing information objects according to an itinerary. Application relation/interaction information 325 may include information with respect to adapters and/or applications (e.g., particular adapters/applications, classes of adapters/applications, categories of adapters/applications, and the like) which are related or otherwise interact, such as with respect to particular data, particular data types, particular transactions, particular transaction types, etcetera, as qualified by qualifier component 310. Based upon qualification of a particular information object, a particular type of information object, a particular class of information objects, a particular transaction, a particular type of transaction, etcetera, by qualifier component, routing component 320 uses one or more of routing information 321, publishing information 322, consumption information 323, itinerary information 324, and application relation/interaction information 325, to provide appropriate routing information for use in providing intelligent routing according to an embodiment of the present invention. Detail with respect to a routing component's use of information, such as provided by routing information 321, publishing information 322, consumption information 323, itinerary information 324, and application relation/interaction information 325 of the illustrated embodiment, is provided below with reference to operation of an exemplary embodiment.

Having described the layers of a preferred embodiment adapter, their use with respect to an exemplary interface will be described. To provide an example of operation of adapters according to an embodiment of the present invention, it will be assumed that application 102 comprises a claim system, that application 101 comprises a case management system, and, as but one example business process which may be provided an inter-application interface according to the present invention, that a user at terminal 202 has added a new member to the claim system of application 102. For example, the user may have input a new member's name, address, age, telephone number, weight, height, etcetera through a user interface of application 102. The user may desire that corresponding new member records be created in one or more other applications of enterprise system 100. Accordingly, an inter-application interface of embodiments of the present invention is invoked to provide the proper information to appropriate applications, such as application 101, as well as to perform the appropriate functions to achieve creation of the new record and populate the appropriate fields with information.

Adapter 114, associated with application 102 wherein the user has created the new member record, operates to provide information to a corresponding adapter, such as adapter 111 associated with application 101. For example, application interface layer 241 under control of business logic layer 242 may monitor a resource associated with application 102, such as a database (not shown), to recognize that an event associated with the business process for which adapter 114 is responsible has transpired (e.g., the appearance of a new member record). Additionally or alternatively, application interface layer 241 may monitor output of application 102 to determine that inter-application communications are to be conducted. For example, application 102 may output new member information, perhaps under control of the user, for creating corresponding records in other applications. Although application 102 may have the capability to output information for updating other applications, application 102 of the illustrated embodiment does not possess the ability to provide the information in the appropriate format, is unaware of which other applications are to receive the corresponding update, and does not know the particular functions to invoke to achieve an appropriate update by such applications. Accordingly, adapters of embodiments of the present invention provide such functionality.

Having determined that an event has transpired, or otherwise having determined that inter-application communications are to be performed, application interface layer 241 obtains the appropriate information from application 102 and/or its associated resources and converts the information to a generic format of common communication bus 120. For example, application interface layer may cooperate with business logic layer to identify the particular information available from application 102 and/or its associated resources for use in an associated business process. The identified information may be obtained by application interface layer 241 and converted to a format of common communication bus 120 for forming an information object by business logic layer. According to a preferred embodiment, the information obtained by application interface layer 241 and placed into an information object by business logic layer 242 comprises all the information from application 102 associated with the business process. For example, in the add member example, the new member's name, address, age, telephone number, weight, height, etcetera may be obtained, although one or more consuming application may use only a portion of this information. Accordingly, the information object created is adapted to be utilized by a number of different applications (including applications which are later modified or added) without modification to adapter 114.

Business logic layer 242, in addition to cooperating with application interface layer 241 to identify information to be obtained and placing the information into an information object, operates to determine what function objects are to be associated with the information for facilitating the business process at an interfaced application. In the new member example, business logic layer 242 may associate an "add" function object with the information object. Business logic layer 242 of a preferred embodiment identifies corresponding applications or their interfaces to which the objects apply, such as by indicating a business process the information object (or objects) and function object (or objects) is to accomplish. Although the present example is described with respect to providing new member information to application 101 comprising a case management system, it should be appreciated that the foregoing objects may be provided to any number of applications (including multiple iterations of the same application, multiple applications providing the same or similar functionality, multiple applications consuming the same information, etcetera). All the foregoing information may be passed to communication layer 244 for communication via common communication bus 120 to adapter 111.

In providing intelligent routing according to embodiments of the invention, business logic layer 242 may utilize qualifier component 310 to analyze a particular transaction, information object, etcetera to determine if particular routing information as defined by a routing rule is to be associated therewith. For example qualifier component 310 may analyze a transaction and/or an information object associated therewith, referencing any combination of data content information 311, transaction type information 312, and historical information 313, to determine if one or more routing rules applies thereto. If a routing rule applies to the transaction and/or information object, routing component 320 preferably operates to determine the appropriate routing information to associate therewith in order to facilitate intelligent routing resulting in delivery of an information object to one or more appropriate applications. Routing component 320 may utilize any combination of routing information 321, publishing information 322, consumption information 323, itinerary information 324, and application relation/interaction information 325, in associating appropriate routing information with a transaction and/or information object according to an embodiment of the present invention.

For example, in the add member example, qualifier component 310 may use data content information 311 to analyze the information from application 102 (e.g., the data fields member's name, address, age, telephone number, weight, height, etcetera and/or the actual data within the fields) to determine one or more routing rules is to apply to the information object. Additionally or alternatively, qualifier component 310 may used transaction type information 312 to analyze the transaction (e.g., identifying a particular combination of data fields included, identifying a particular data field present, etcetera) to determine one or more routing rules is to apply to the information object. Likewise, qualifier component 310 may use historical information 313 to analyze historical information associated with the transaction or information associated therewith (e.g., identifying a particular individual associated with the transaction and a service provided in the transaction to determine that the individual has already been provided that service in the recent past) to determine one or more routing rules is to apply to the information object.

Thereafter, routing component 320 may use routing information 321, publishing information 322, consumption information 323, itinerary information 324, and/or application relation/interaction information 325 to determine adapters and/or applications the information is to be routed to. Routing component 320 of embodiments may reference 4 publishing information 322 to determine where and/or in what form an information object is to be published. Consumption information 323 may be referenced by routing component 320 to determine which adapters/applications are consumers of information objects, such as to determine a proper form for publishing/routing the information objects, a proper time for publishing/routing the information objects, etcetera. Itinerary information 324, such as may comprise routing information provided by qualifier component 310, may be referenced by routing component 320 to determine when and/or where an information object. Routing component 320 may reference application relation/interaction information to determine one or more applications particular information objects or information objects associated with particular transactions are to be routed.

The foregoing routing information may comprise information in addition to that useful for providing data to one or more particular adapters/applications. For example, transaction type information 312 may indicate that the information is associated with a transaction involving a series of steps implemented by a plurality of applications. As one example, a new physician may be added to an insurance reimbursement application and transaction type information 312 may recognize that a credentialing application is to be invoked with respect to the new physician in order to establish services which may properly be provided by that physician. Transaction type information 312 may further recognize that a claims processing application should be updated to include the new physician but, to avoid improper payments, that the physician should not be added to the claims processing system until such time as that physician's credentials have been confirmed as indicated by the credentialing application. Therefore, the routing information may include an itinerary for routing the information object, or portions thereof, to the appropriate applications in the appropriate order and/or upon the occurrence of particular events to times.

The illustrated embodiment includes adapter agent 243 disposed between business logic layer 242 and communication layer 244. Adapter agent layer 243 may monitor objects passed between business logic layer 242 and communication layer 244 to provide the ability to monitor the performance of an interface provided by the adapters, to provide transaction logging, and/or to validate that the is working. For example, adapter agent 243 may provide information with respect to objects passed between business logic layer 242 and communication layer 244 to logging/monitoring agent 131.

Using information identifying corresponding applications or their interfaces provided by business logic layer 242, communication layer 244 communicates the information objects and function objects to appropriate destinations. For example, where the information is not real-time, communication layer 244 may publish the objects directly to adapter 111 or a published information database for later retrieval by adapter 111. Where the information is real-time, communication layer 244 preferably communicates the objects directly to adapter 111 for real-time updating of the case management system of this example. Additionally or alternatively, communication layer 244 may place the information objects and function objects on common communication bus 120 for the appropriate adapters to recognize this information as being relevant to their functions and consume the information accordingly.

In operation according to a preferred embodiment, communication layer 244 implements a communication component to provide the forgoing routing of information objects. For example, a communication component of embodiments references routing information, as may be provided by routing component 320, to determine if an information object is to be published or directly routed and to determine where an information object is to be directly routed.

It should be appreciated that communication layer 244 may control routing of information objects throughout an itinerary, such as by providing initial routing of the information object, monitoring times and/or events, and providing subsequent routing of the information object. Alternatively, various communication layers (and/or other adapter layers) may control routing of information objects throughout an itinerary, such as by communication layer 244 providing initial routing of the information object and a communication layer of a subsequent adapter monitoring times and/or events and providing subsequent routing of the information object.

The layers of adapter 111 essentially work in the reverse of that described above with respect to the layers of adapter 114. For example, communication layer 214 obtains the objects communicated by communication layer 244, such as directly from communication layer 244 or from a published information database. Business logic layer 212 of an embodiment analyzes the function objects to determine what business operation is to be performed and uses its business logic to determine the steps associated with the business operation as well as the particular information within the information objects relevant to application 101 in this business operation. Application interface layer 211 converts the information and the function steps into the format and steps specific to accomplishing adding the new member to application 151. The information may be provided to application 101 and/or directly to one or more resources of application 101, such as database 151, by application interface layer 211.

As with adapter agent 243 discussed above, adapter agent 213 is disposed between business logic layer 212 and communication layer 214. Adapter agent layer 213 may monitor objects passed between business logic layer 212 and communication layer 214 to provide the ability to monitor the performance of an interface provided by the adapters, to provide transaction logging, and/or to validate that the is working. For example, adapter agent 213 may provide information with respect to objects passed between business logic layer 212 and communication layer 214 to logging/monitoring agent 131.

Routing rules 300, as implemented in an adapter receiving an information object, may be utilized in the receiving of information objects according to embodiments of the invention. For example, routing component 320, as may be implemented in communication layer 214, may reference consumption information 323 to determine if a particular information object which was published or routed by another adapter is to be consumed by adapter 111. Additionally or alternatively, an adapter receiving an information object having a routing itinerary associated therewith may store routing itinerary information in itinerary information 324 to facilitate routing component 320 controlling subsequent routing of the information object.

From the above, it may be readily appreciated that adapters of embodiments of the present invention provide the ability to inspect each transaction or each event that is occurring in an enterprise systems and identify, in real-time, applications that need to know about that transaction or event happening. Accordingly, operation of embodiments of the invention provides dynamic interfaces, rather than the "hard-wired," point-to-point, interfaces of past EAI systems. Moreover, the dynamic interfaces of embodiments of the present invention provide advantages in addition to flexibility in routing information. As discussed above, interfaces of embodiments of the invention have the ability to develop an itinerary that establishes a series of routing instructions and/or a routing schedule for communicating information by and between applications.

Although adding a member of this example has been described with reference to information flowing from application 102 to application 101, it should be appreciated that such information may flow bi-directionally as well as uni-directionally. For example, application 101 may provide responsive information which passes through the layers of adapter 111 and adapter 114 to application 102. Similarly, adapter 111 may provide responsive information to adapter 114, such as to confirm the update, to request additional information, etcetera.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for interfacing software applications, said method comprising:

interfacing, by a first adapter of a processor-based system, between a first application of said software applications and at least one other application of said software applications, said interfacing comprising routing information according to or dynamically providing routing decisions with respect to communication of said information, said routing rules including at least one qualifying component specifying whether a particular routing rule is to be applied to a particular information object and at least one routing component specifying routing information associated with said particular information object; and interfacing, by a second adapter of a processor-based system, between a second application of said software applications and at least one other application of said software applications, wherein at least a portion of said information is communicated directly between said first application and said second application via said first adapter and said second adapter according to a common communication bus format, wherein said routing information further comprises dynamically providing routing decisions according to said routing rules to establish a routing itinerary for said information, wherein said routing itinerary establishes a series of applications said information is routed to by said first adapter, and wherein said routing itinerary establishes an event for routing said information to at least one application of said series of applications.

2. The method of claim 1, wherein said routing information further comprises dynamically providing routing decisions according to said routing rules based at least in part on a content of said information.

3. The method of claim 1, wherein said routing information further comprises dynamically providing routing decisions according to said routing rules based at least in part on a transaction associated with said information.

4. The method of claim 1, wherein said routing information further comprises dynamically providing routing decisions according to said routing rules based at least in part on a history associated with said information.

5. The method of claim 1, wherein said routing itinerary establishes a time for routing said information to at least one application of said series of applications.

6. The method of claim 1, wherein said at least one qualifying component is associated with a different operational layer of said first adapter than said routing component.

7. The method of claim 1, wherein said interfacing, by said second adapter, further comprises routing information according to routing rules of said second adapter, for dynamically providing routing decisions with respect to communication of information from said second application to said at least one other application of said software applications.

8. The method of claim 7, wherein said routing rules of said second adapter work in cooperation with routing rules of said first application to implement a routing itinerary with respect to information communicated from said first application to said second application.

9. The method of claim 1, wherein said software applications comprise an enterprise system.

10. The method of claim 9, wherein an enterprise using said enterprise system comprises an enterprise providing healthcare services.

11. The method of claim 1, wherein said interfacing, by said first adapter, further comprises interfacing between said first application and said at least one other application of said of software applications using a web services module.

12. The method of claim 1, wherein said interfacing, by said first adapter, further comprises interfacing between said first application and said at least one other application of said software applications using a messaging module.

13. The method of claim 1, wherein said interfacing, by said first adapter, further comprises interfacing between said first application and said at least one other application of said software of applications using a publishing module.

14. The method of claim 1, wherein said first adapter and said second adapter each comprises a processor-based device.

15. A method for interfacing software applications, said method comprising:

establishing, by a processor-based system, an interface fabric between a plurality of applications, said interface fabric including interface logic associated with each application of said plurality of applications, and being configured for intercommunication such that information from any one application of said plurality of applications can be communicated to more than one other application of said plurality of applications, said interface logic comprising a plurality of adapters that each provide communication with a corresponding application of said plurality of applications in a format native to said application, and said plurality of adapters being configured to communicate directly with each other in an adapter common communication bus format;

determining, by a processor-based system, routing rules for information associated with a first application of said plurality of applications by interface logic associated therewith, said routing rules including at least one qualifying component specifying whether a particular routing rule is to be applied to a particular information object and at least one a routing component specifying routing information associated with said particular information object;

associating, by a processor-based system, said routing rules with said information; and routing, by a processor-based system, said information in accordance with said routing rules, wherein said determining routing rules further comprises establishing an itinerary for routing said information to another application of said plurality of applications, wherein said itinerary establishes a series of applications of said plurality of applications to which said information is to be routed, and wherein said itinerary establishes an event for routing said information to said another application of said plurality of applications.

16. The method of claim 15, wherein said determining routing rules further comprises analyzing a content of said information.

17. The method of claim 15, wherein said determining routing rules further comprises analyzing a transaction associated with said information.

18. The method of claim 15, wherein said determining routing rules further comprises analyzing historical information associated with said information.

19. The method of claim 15, wherein said itinerary establishes a time for routing said information to said another application.

20. The method of claim 15, wherein said determining routing rules further comprises determining said routing rules information in real-time.

21. The method of claim 15, wherein said routing said information further comprises routing said information to an application of said plurality of applications in real-time.

22. The method of claim 15, wherein said routing said information further comprises publishing said information for consumption by an application of said plurality of applications.

23. The method of claim 15, wherein said plurality of adapters each comprise a processor-based device.

24. A method for routing information between software applications, said method comprising:

providing, by a processor-based system, interface logic interfacing at least three applications for information communication, said providing said interface logic comprising providing an adapter in association with each application of said at least three applications, each said adapter being configured to communicate with a corresponding application in a format native to said corresponding application and communicate directly with other adapters in an adapter common communication bus format;

analyzing, by a processor-based system, information associated with a first application of said at least three applications based on routing rules, to determine an appropriate one of second and third applications of said at least three applications to which said information is to be routed, said routing rules including at least one qualifying component specifying whether a particular routing vale is to be applied to a particular information object and at least one a routing component specifying routing information associated with said particular information object; and routing, by a processor-based system, said information in accordance with a result of said analyzing, wherein said analyzing information associated with a first application of said at least three applications based on routing rules comprises establishing an itinerary for routing said information to second and third applications of said at least three applications, wherein said itinerary establishes a series of applications of said at least three applications to which said information is to be routed, and wherein said itinerary establishes an event for routing said information to said second and third applications of said at least three applications.

25. The method of claim 24, wherein said analyzing information further comprises analyzing said information in real-time.

26. The method of claim 24, wherein said adapter comprises a processor-based device.

27. A method for routing information between software applications, said method comprising:

providing, by a processor-based system, interface logic interfacing at least three applications for information communication, said providing said interface logic comprising providing an adapter in association with each application of said at least three applications, each said adapter being configured to communicate with a corresponding application in a format native to said corresponding application and communicate directly with other adapters in an adapter common communication bus format;

analyzing, by a processor-based system, information associated with a first application of said at least three applications based on routing rules, to determine an itinerary for routing said information to second and third applications of said at least three applications, said routing rules including at least one qualifying component specifying whether a particular routing rule is to be applied to a particular information object and at least one a routing component specifying routing information associated with said particular information object; and routing, by a processor-based system, said information in accordance with a result of said analyzing, wherein said analyzing information further comprises analyzing in real-time, wherein said itinerary establishes a series of applications of said at least three applications to which said information is to be routed, and wherein said itinerary establishes an event for routing said information to said second and third applications of said at least three applications.

28. The method of claim 27, wherein said analyzing information further comprises analyzing at least one of a content of said information, a transaction associated with said information, and a history associated with said information.

29. The method of claim 27, wherein said adapter comprises a processor-based device.

* * * * *